United States Patent
Wilke (12)

(10) Patent No.: US 6,210,620 B1
(45) Date of Patent: Apr. 3, 2001

(54) METHOD FOR MAKING AN ELASTIC MAT

(75) Inventor: Helmut Wilke, Köln (DE)

(73) Assignee: ContiTech Transportbandsysteme GmbH, Hannover (DE)

(*) Notice: Subject to any disclaimer, the term of this patent is extended or adjusted under 35 U.S.C. 154(b) by 0 days.

(21) Appl. No.: 09/026,563

(22) Filed: Feb. 20, 1998

(30) Foreign Application Priority Data

Feb. 22, 1997 (DE) .............................. 197 07 102

(51) Int. Cl.[7] ...................................... B29C 3/10
(52) U.S. Cl. ..................... 264/257; 264/259; 425/812
(58) Field of Search ................................ 264/257, 258, 264/259, 102; 425/812

(56) References Cited

U.S. PATENT DOCUMENTS

| | | | |
|---|---|---|---|
| 3,313,674 | * 4/1967 | Mathews | 428/148 |
| 3,733,159 | * 5/1973 | Coffman | 425/394 |
| 4,174,991 | * 11/1979 | Reuben | 156/242 |
| 4,399,176 | * 8/1983 | Bell et al. | 428/85 |
| 4,636,422 | * 1/1987 | Harris et al. | 428/174 |
| 4,696,429 | 9/1987 | Ortwein . | |
| 5,599,606 | * 2/1997 | Disselbeck et al. | 428/156 |
| 5,741,450 | * 4/1998 | Monroe | 264/102 |
| 6,004,122 | * 12/1999 | Terajima | 425/117 |

FOREIGN PATENT DOCUMENTS 4040591   6/1992   (DE) .

* cited by examiner

Primary Examiner—Jan H. Silbaugh
Assistant Examiner—Stefan Staicovici
(74) Attorney, Agent, or Firm—Walter Ottesen

(57) ABSTRACT

A large-area rubber molded piece (31) is produced by vulcanization in a heatable plate molding press. The rubber molded piece is provided with a plurality of projections (32) on its lower side and the press includes a plurality of mold cavities (14). An open mesh fabric (15) is placed on the mold cavities (14) for venting and covers all of the mold cavities. A plate of green rubber (17) is then placed upon the fabric (15). When the heatable plate molding press is closed and heated, the fabric (15) is penetrated by the plasticized green rubber and each mold cavity (14) is vented via the fabric. The fabric (15) is embedded in the rubber molded piece and becomes a part thereof.

4 Claims, 1 Drawing Sheet

METHOD FOR MAKING AN ELASTIC MAT

FIELD OF THE INVENTION

The invention relates to a method of making a large-area rubber molded piece by vulcanization in a heatable plate molding press which has a plurality of mold cavities therein. The rubber molded piece is provided with a plurality of projections on its lower side and is especially in the form of a mat made of elastic material. This mat serves, for example, as a base support for a ballast bed.

BACKGROUND OF THE INVENTION

Rubber mats having projections at the lower side thereof are utilized in track construction and function to support the ballast bedding as well as the ties and rails placed thereupon with respect to the ground and with respect to tunnel walls and trough walls in order to attenuate the transmitted sound.

German patent publication 3,425,647 discloses a mat of the kind described above. This mat has a high-strength fabric at its upper side which is configured to have two layers. The projections at the lower side of the mat can be configured as steps or as truncated-conical projections or as cylindrical nubs. The steps have a trapezoidal shape when viewed in cross section.

The production of mats of this kind of elastic base material is carried out stepwise in a heatable plate molding press. To achieve the projections formed at the lower side, it is necessary to provide a plurality of mold cavities spaced closely to each other in the plate form press. These mold cavities have the negative shape of the projections. In each heating step, approximately 33,000 mold cavities are arranged, for example over a 15 m² press surface.

When forming the projections in the mold cavities, it is necessary to provide each mold cavity with venting channels so that air and other gas, which is trapped as the green rubber is pressed in, can be conducted away. If venting of the mold cavities is not effective, then the projections are poorly formed because the plastic rubber cannot completely fill out the mold cavities.

These venting channels cause the so-called flashing or excess rubber which is rubber pressed into the venting channels during the flow phase. The excess rubber must then be removed with difficulty in a later work step.

A method for making flat rubber hollow bodies, which can be inflated, is disclosed in German patent publication 4,040,591. In this method, a press mold is used wherein the mold inner wall of one or both form halves is provided with a fabric extending beyond the mold space. With this arrangement, it is intended to improve the removal of the air and gas during the vulcanization step. This lining of a relatively large mold for a unitary molded body cannot be realized for a plurality of mold cavities close to each other. In addition, the product which is formed is provided with an impression of the fabric, which lines the mold contour, and this is not always wanted. Furthermore, venting channels leading to the outside for conducting away the air are necessary.

SUMMARY OF THE INVENTION

It is an object of the invention to configure a method of the kind described above so that large-area rubber molded pieces can be produced which have a precise formation of the projections on the lower side. A complex follow-up work step of the molded and fully cured rubber molded piece is avoided.

The method of the invention is for making a large-area rubber molded piece utilizing a heatable plate molding press having a lower part defining a plurality of mold cavities therein and a lateral edge and having an upper part defining a plate.

According to a first embodiment of the method of the invention, the method includes the steps of: placing an open mesh fabric on the lower part so as to cover all of the mold cavities; placing a plate of green rubber on the fabric; closing and heating the heatable plate molding press whereby the plasticized green rubber penetrates the open mesh fabric and is vulcanized; and, conducting air and other gas from the mold cavities through the threads of the open mesh fabric to the lateral edge of the lower part thereby facilitating filling the mold cavities with the green rubber and embedding the fabric in the large-area rubber piece formed thereby.

The fabric is an open mesh fabric and is also known as open texture fabric (Ajour fabric).

The finished rubber molded part exhibits no flashing whatsoever. The fabric defines a venting system and is penetrated by rubber during the molding process and this fabric is embedded in the rubber molded part. The fabric becomes advantageously effective for the finished product as a reinforcement.

If an open mesh cotton fabric is used as a venting fabric, then an effective venting effect is achieved. Cotton fibers, as natural fibers or thin threads, have a rough surface. These natural fibers are up to 5 cm long and have a high capillarity. Cotton fibers have a water absorption volume of 25%. In contrast thereto, polyester threads, for example, have only a water absorption capability of 5%.

According to a second embodiment of the method of the invention, the method includes the steps of: placing a paper web on the lower part so as to cover all of the mold cavities; placing a plate of green rubber on the paper web; closing and heating the heatable plate molding press whereby the plasticized green rubber pushes the paper web against the walls of the cavities and is vulcanized; and, conducting air and other gas from the mold cavities through the paper web to the lateral edge of the lower part thereby facilitating filling the mold cavities with the green rubber and causing the paper web to become joined to the large-area rubber piece formed thereby.

The paper web is pressed to the respective inner walls of the mold cavities because of the press-in pressure of the rubber and bonds to the outer surface of the rubber mold piece during heating.

Previously, the venting system was defined as a part of the plate molding press. However, and according to a feature of the method of the invention, the venting system becomes a component of the rubber molded piece which is produced.

When applying the invention to make an elastic mat, for example, for a ballast bed, long pieces of green rubber and fabric are moved together through the heatable plate molding press and heat and pressure are applied to successive segments of the green rubber and fabric as the latter are indexically moved through the press.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
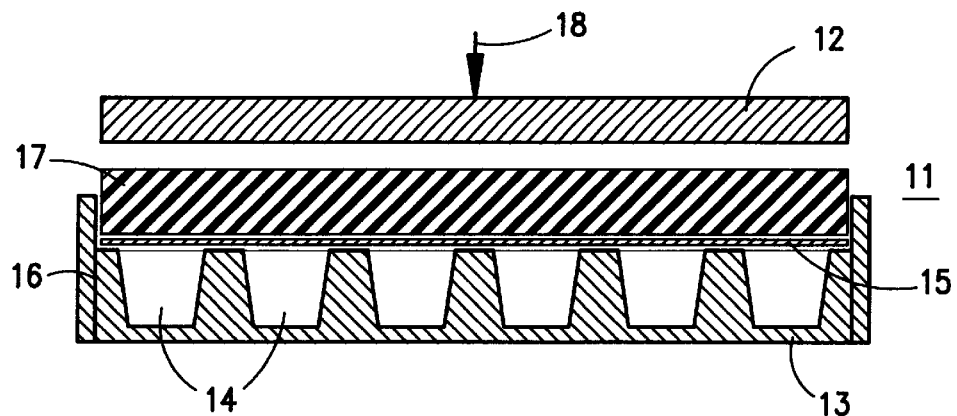
FIG. 1 is a section view taken through a heatable plate molding press into which the starting component parts are placed for a rubber mat which is to be produced by compression molding.

The plate molding press 11 is shown schematically in FIG. 1 and comprises a plate upper part 12 and a plate lower part 13 which is provided with a plurality of mold cavities 14. An open mesh cotton fabric 15 is placed on the mold cavities 14. The open mesh fabric 15 extends up to the edges 16 of the plate molding press 11. A plate 17 of green rubber is placed on the mold cavities 14.

Figure 2:
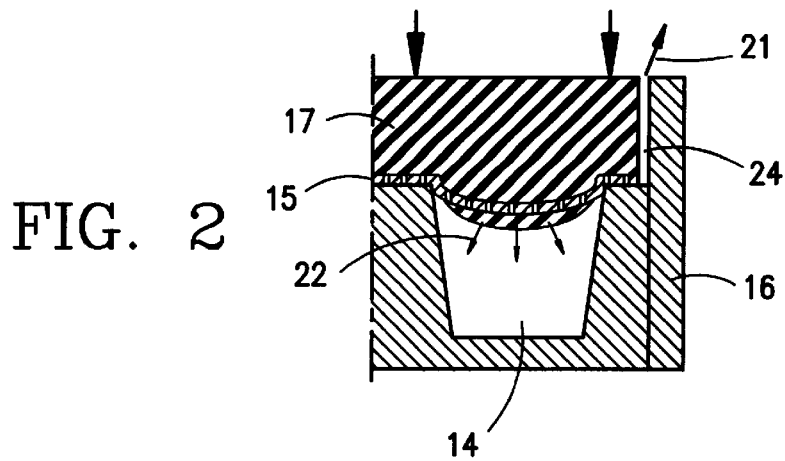
FIG. 2 shows the start of pressing in the plasticized rubber into a mold cavity.

When the heatable plate molding press 11 is closed (arrow 18), the green rubber plate 17 seals off the mold cavities 14 (FIG. 2). However, the air can escape to the edge 16 via the perforated woven cotton fabric 15 and flow out (arrow 21) via a gap 24. The green rubber 17 penetrates the cotton fabric 15 (arrows 22) when the plate molding press 11 is moved downwardly as shown. The plasticized rubber is homogenized and vented during this process. The green rubber 17 is pressed into the mold cavities 14 by the pressure on the plate upper part 12 and the heating of the plate molding press 11. The green rubber 17 is vulcanized over a specific time.

Figure 3:
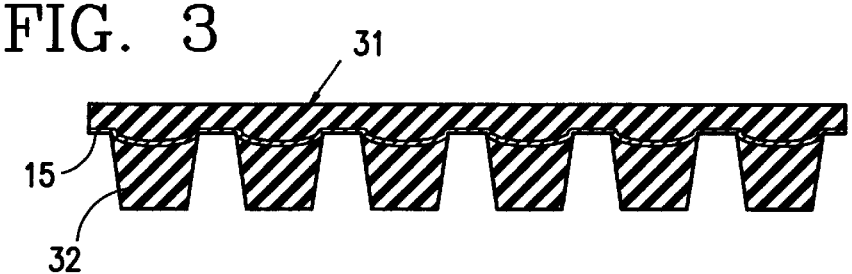
FIG. 3 is a section view of a fully formed and fully cured rubber mat having projections formed on the lower side thereof; and, FIG. 4 is a detail view of a portion of a mat made in accordance with another embodiment of the invention.

In this molding operation, the fabric 15 itself is integrated into the green rubber material and is therefore integrated into the vulcanized product 31 (see FIG. 3). The molded projections 32 are strengthened by the cotton fabric 15.

Figure 4:
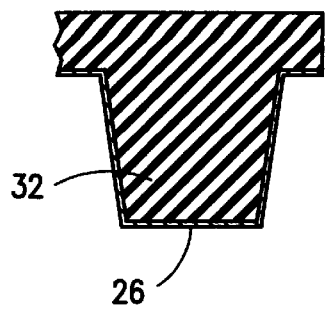

According to another embodiment of the method of the invention, a paper web 26 is placed on the lower part 13 so as to cover all of the mold cavities 14. A plate 17 of green rubber is then placed on the paper web. The heatable plate molding press is then heated and closed whereby the plasticized green rubber pushes the paper web against the walls of the cavities and is vulcanized. The air and other gas is conducted from the mold cavities 14 through the paper web 26 to the lateral edge of the lower part 13 thereby facilitating filling the mold cavities 14 with the green rubber and causing the paper web 26 to become joined or vulcanized to the large-area rubber piece formed thereby as shown in the detail view of FIG. 4. When the heatable molding press is closed, a narrow gap 24 remains as shown in FIG. 2 so that the air and other gas vented from the mold cavities 14 can escape from the press.

It is understood that the foregoing description is that of the preferred embodiments of the invention and that various changes and modifications may be made thereto without departing from the spirit and scope of the invention as defined in the appended claims.

What is claimed is:

1. A method for making a rubber molded piece utilizing a heatable plate molding press having a lower part defining a plurality of mold cavities therein and a lateral edge and having an upper part defining a plate, the method comprising the steps of:

placing an open mesh fabric on said lower part so as to cover all of said mold cavities and to extend to said lateral edge of said lower part;

placing a plate of green rubber on said fabric;

closing and heating said heatable plate molding press while leaving a gap between said plate of green rubber and said lateral edge communicating with the ambient whereby the plasticized green rubber penetrates said open mesh fabric to fill said mold cavities and is vulcanized; and, conducting air and other gas from said mold cavities through said threads of said open mesh fabric to said lateral edge of said lower part and through said gap to the ambient thereby facilitating filling said mold cavities with said green rubber to form projections on said rubber molded piece and to embed said fabric in the rubber molded piece formed thereby to provide a reinforcement therefor.

2. The method of claim 1, wherein said fabric is an open mesh cotton fabric.

3. The method of claim 1, wherein said rubber molded piece includes a plurality of projections molded on the lower side thereof by said mold cavities.

4. The method of claim 2, said rubber piece being a mat of elastic material functioning as a support for a ballast bed.

* * * * *